United States Patent

Kingston

[11] Patent Number: 6,036,077
[45] Date of Patent: Mar. 14, 2000

[54] FRICTION WELDED SHAFT

[75] Inventor: Tim Kingston, Eskilstuna, Sweden

[73] Assignee: Volvo Wheel Loaders AB, Eskilstuna, Sweden

[21] Appl. No.: 09/011,920

[22] PCT Filed: Sep. 6, 1996

[86] PCT No.: PCT/SE96/01110

§ 371 Date: Feb. 23, 1998

§ 102(e) Date: Feb. 23, 1998

[87] PCT Pub. No.: WO97/09148

PCT Pub. Date: Mar. 13, 1997

[30] Foreign Application Priority Data

Sep. 7, 1995 [SE] Sweden ................................. 9503086

[51] Int. Cl.$^7$ ................................................ B23K 20/12
[52] U.S. Cl. ........................... 228/114; 74/432; 403/270; 403/359.1
[58] Field of Search .................................. 403/270, 271, 403/272, 265, 359.1; 74/432; 228/114, 114.5

[56] References Cited

U.S. PATENT DOCUMENTS

| | | | |
|---|---|---|---|
| 3,631,585 | 1/1972 | Stamm . | |
| 3,658,605 | 4/1972 | Tomita et al. | ............................ 148/154 |
| 4,180,421 | 12/1979 | Joseph et al. | ............................ 148/150 |
| 4,599,502 | 7/1986 | Khare et al. | ............................. 219/8.5 |
| 4,659,005 | 4/1987 | Spindler | .............................. 228/114 X |
| 4,768,839 | 9/1988 | Spindler . | |
| 5,005,989 | 4/1991 | Karlsson | .................................. 384/94 |

FOREIGN PATENT DOCUMENTS

| | | |
|---|---|---|
| 0 473 061 | 3/1992 | European Pat. Off. . |
| 40 40 520 | 7/1991 | Germany . |
| 5-10319 | 1/1993 | Japan . |
| 1 470 198 | 4/1977 | United Kingdom . |

*Primary Examiner*—Lynne Reichard
*Assistant Examiner*—John R. Cottingham
*Attorney, Agent, or Firm*—Young & Thompson

[57] ABSTRACT

Shaft, for the transmission of torque, comprising first and second engagement elements. The shaft is divided in its longitudinal direction into a first and second section, wherein the first and second sections are concentrically joined to each other by a friction-welded joint. The first section is case-hardened and comprises the first engagement element, and the second section is tough-hardened and comprises the second engagement element which is induction-hardened and placed on or in a peripheral surface on the second section which lies at an end facing away from the first section.

7 Claims, 1 Drawing Sheet

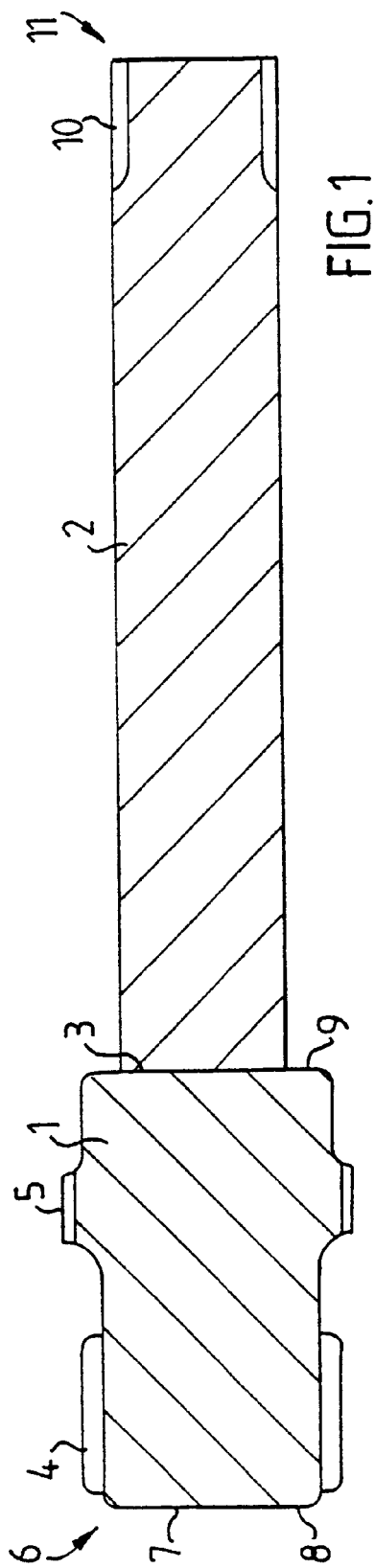
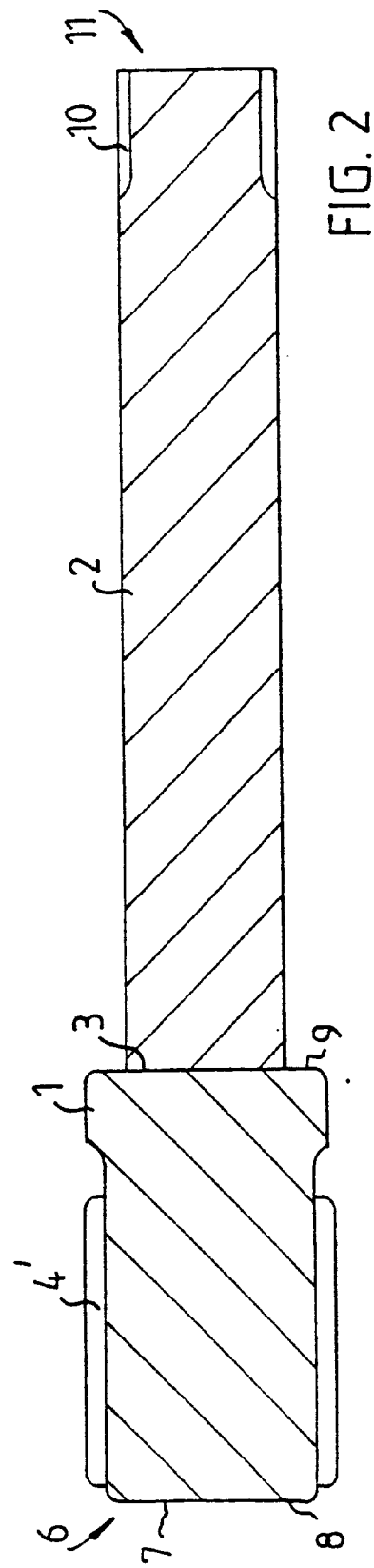

FRICTION WELDED SHAFT

FIELD OF THE INVENTION

The present invention relates to a shaft, for the transmission of torque, comprising first and second engagement means, which shaft in its longitudinal direction is divided into a first and a second section, wherein the first and second sections are concentrically joined to each other by means of a joint, in addition to which the first section is case-hardened and comprises the first engagement means, and the second section is tough-hardened and comprises the second engagement means. The invention also relates to a process for its manufacture.

BRIEF DESCRIPTION OF THE INVENTION

Up to now shafts which comprise a case-hardened section and a tough-hardened section have been joined to each other by a splined joint. In order to stop the sections being relatively displaced to one another in the longitudinal direction of the shaft, the splined joint has been provided with locking washers which engage in the respective sections. In a rotating shaft a precise centering of such a joint is required. With repeated torque changes, i.e. when the direction of rotation or the load changes frequently, play can appear in the splined joint which in the long term leads to a breakdown.

SUMMARY OF THE INVENTION

The main object of the present invention is to provide a shaft which has a higher strength, a more compact construction, a lowered number of constituent components and which has a lower manufacturing cost than previously known shafts which comprise two sections joined to each other.

According to the invention this is achieved with a shaft which has a friction-welded joint.

In the production of a shaft according to the invention with a first section which comprises a first engagement means in the form of, for example, cogs and teeth, the section is case-hardened in order to achieve the necessary surface hardness on the cog flanks and teeth. The sections are subsequently welded together by friction welding, whereafter the teeth are machined on a region of the second section. Subsequently the second section is induction-hardened in the region where the teeth have been produced.

As the first section has been case-hardened before the welding operation, the whole shaft does not need to go through a relatively expensive case-hardening operation.

BRIEF DESCRIPTION OF THE DRAWINGS

The invention will be described below in more detail by way of some examples of embodiments with reference to the appended drawings.

FIG. 1 shows a sectioned lateral view of a shaft according to a first embodiment.

FIG. 2 shows a sectioned lateral view of a shaft according to a second embodiment.

DETAILED DESCRIPTION OF THE PREFERRED EMBODIMENTS

The shaft according to FIG. 1 comprises a first and a second section 1 resp. 2, which are joined concentrically through a friction-welded joint 3. The second section 2 is substantially longer than the first section 1. The first section 1 is equipped with first engagement means which are partly formed of cogs 4 which are intended for a gear-transmission (not shown), partly of teeth 5 which are intended for a first splined joint (not shown). The gear-transmission can be a planetary gear where the first section 1 forms a sun wheel. The first splined joint can be shaped to form a joint between the first section 1 and a brake disc in a friction brake.

The cogs are placed on a peripheral surface on the first section 1 which lies at an end 6 which faces away from the second section 2. The teeth 5, which are intended for the first splined joint, are placed on the peripheral surface of the first section 1 in a region between the teeth 5 and the friction-welded joint 3.

The first section 1 is provided with a first shoulder surface 7 which lies at the end of a surface 8 which faces away from the second section 2. The first shoulder surface 7 can form an abutment surface which is mounted in bearings in said gear-transmission.

The first section 1 can also be provided with a second shoulder surface 9 which coincides with the plane in which the friction-welded joint 3 is positioned. whereby the second shoulder surface 9 can form an abutment surface which is mounted in bearings in a casing or a housing for said friction brake.

In order that the flanks of the cogs 4 and the teeth 5 shall have satisfactory strength, the first section 1 is case-hardened.

According to a second embodiment, shown in FIG. 2, the shaft differs from the first embodiment through the first engagement means only being formed from cogs 4' which on the one hand are intended for a cog-gear (not shown), and on the other hand are intended for a first splined joint (not shown). The cogs 4' consequently extend in the second embodiment a substantial distance in the axial direction so that the cogs 4' can replace the teeth 5 which were shown in the first embodiment.

The second section 2 is provided with a second engagement means, which is formed of teeth 10 which are intended for a second splined joint (not shown). The second splined joint can form a joint between the second section 2 and a cog-wheel which is part of a differential gear.

The second section 2 is tough-hardened before the friction welding in order to achieve a satisfactory strength. The teeth 10, which are intended for the second splined joint, are machined on a peripheral surface of the second section, which lies at an end 11 which faces away from the first section 1, after the friction welding and a possible subsequent straightening have taken place. The area for the teeth 10 is induction-hardened after the teeth 10 have been machined.

The manufacturing of the shaft is performed according to the following steps: The second section 2 is made, for example by cutting, considerably longer than the first section 1. Subsequently, the first engagement means 4, 5 resp. 4' on or in a peripheral surface of the first section 1, are machined, whereafter the first section 1 is case-hardened. Then the section 2 is tough-hardened and joined concentrically with the first section 1 by means of friction welding, whereby a friction-welded joint 3 is formed. After the friction welding the second engagement means, which is formed of teeth 10, is machined on or in a peripheral surface of the second section which lies at an end 11 faces away from the first section 1. Finally, the area of teeth 10, which are intended for the second splined joint, is induction-hardened.

The machining of the cogs 4 resp. 4' and the teeth 5 resp. 10 can, for example, be performed by means of milling.

Before the first section is case-hardened, the first and second shoulder surfaces 7 resp. 9 can be machined on or in the first section through e.g. turning.

The shaft according to the invention can, for example, be used as a drive shaft in a vehicle.

I claim:

1. Method for the manufacturing of a shaft intended for the transmission of torque, comprising first and second engagement means (4, 4', 5 resp. 10), the shaft is divided in its longitudinal direction into a first and a second section (1 resp. 2), characterized in that the second section (2) is made considerably longer than the first section (1), that the first engagement means (4, 5 resp. 4') comprising cogs (4, 4'), which are machined on or in a peripheral surface on the first section (2), whereafter the first section (1) is case-hardened, that the second section (2) is formed of a tough-hardened material, that the first and second sections (1 resp. 2) after machining and case-hardening of the first section (1) are joined concentrically to each other by means of friction welding, whereby a friction-welded joint (3) is formed, that the second engagement means, which is formed of teeth (10) which are intended for a second splined joint, after the friction welding are machined on or in a peripheral surface on the second section which lies at an end (11) which faces away from the first section (1), and that the area where the teeth (10) intended for the second splined joint lie is induction-hardened after machining.

2. Method according to claim 1, characterized in that the first section (1) before being case-hardened is provided with a first shoulder surface (7) which is machined on or in an end surface (8) which faces away from the second section (2).

3. Method according to claim for 1, characterized in that the first section (1), before being case-hardened, is provided with a second shoulder surface (9), which coincides with the plane in which the friction-welded joint (3) lies.

4. A method for the manufacturing of a shaft intended for the transmission of torque, comprising first and second engagement means, which shaft is divided in its longitudinal direction into a first and a second section, comprising the steps of:

providing the second section made longer than the first section, providing the first engagement means with cogs, the cogs being machined on or in a peripheral surface on the first section, whereafter the first section is case-hardened, providing the second section formed of a tough-hardened material, joining concentrically the first and second sections after machining and case-hardening of the first section to each other by friction welding, whereby a friction-welded joint is formed, and the second engagement means lies at an end of the second section which faces away from the first section.

5. The method according to claim 4, wherein the second engagement means, which is formed of teeth intended for a second splined joint, after the friction welding are machined on or in a peripheral surface on the second section which lies at an end which faces away from the first section, and the area where the teeth intended for the second splined joint lie is induction-hardened after machining.

6. The method according to claim 4, wherein the first section before being case-hardened is provided with a first shoulder surface machined on or in an end surface which faces away from the second section.

7. The method according to claim 4, wherein the first section, before being case-hardened, is provided with a second shoulder surface coinciding with the plane in which the friction-welded joint lies.

* * * * *